United States Patent
Gundlach

(10) Patent No.: US 6,754,312 B1
(45) Date of Patent: *Jun. 22, 2004

(54) METHOD FOR MONITORING A SUBSCRIBER OF AN INTELLIGENT NETWORK

(75) Inventor: Michael Gundlach, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/454,198

(22) Filed: Dec. 3, 1999

(30) Foreign Application Priority Data

Dec. 3, 1998 (DE) .......................... 198 55 921

(51) Int. Cl.[7] .......................... H04M 1/24; H04M 3/08; G06F 15/173
(52) U.S. Cl. ................ 379/32.03; 379/32.04; 709/224
(58) Field of Search .................. 379/32.01–32.05, 379/35, 1.01; 709/224

(56) References Cited

U.S. PATENT DOCUMENTS

| | | | | |
|---|---|---|---|---|
| 4,559,416 A | * | 12/1985 | Theis et al. | 379/32.04 |
| 5,590,171 A | * | 12/1996 | Howe et al. | 379/2 |
| 5,881,132 A | * | 3/1999 | O'Brien et al. | 379/230 |
| 5,923,744 A | * | 7/1999 | Cheng | 379/221.09 |
| 6,229,887 B1 | * | 5/2001 | Albers et al. | 379/207.02 |
| 6,233,313 B1 | * | 5/2001 | Farris et al. | 379/112.01 |
| 6,560,316 B1 | * | 5/2003 | Gundlach | 379/35 |

FOREIGN PATENT DOCUMENTS

WO     WO 97/41678     11/1997

* cited by examiner

*Primary Examiner*—David Wiley
*Assistant Examiner*—George C Neurauter
(74) *Attorney, Agent, or Firm*—Laurence A. Greenberg; Werner H. Stemer; Gregory L. Mayback

(57) ABSTRACT

In a method, a call number of a subscriber that is to be monitored is flagged by an indication of subscribers that are authorized to monitor. A conference circuit between the subscriber which is to be monitored, a calling or called second communications subscriber and a third subscriber which is authorized to monitor is set up in a demand-controlled fashion if a communications link has been set up. If no communication takes place, only event data are transferred.

3 Claims, 2 Drawing Sheets

METHOD FOR MONITORING A SUBSCRIBER OF AN INTELLIGENT NETWORK

BACKGROUND OF THE INVENTION

Field of the Invention

The invention relates to a method for monitoring a communications link, in particular a telephone call, between two communications subscribers. At least one of the subscribers is a subscriber which is to be monitored, the identifier (for example the IN call number or "Personal User Identity") of the subscriber or subscribers which is/are to be monitored, or of a subscriber which is to be monitored, being flagged. The flagging containing an indication of which third communications subscriber or subscribers is/are to be authorized to monitor a communications link to the subscriber which is to be monitored. If a subscriber which is to be monitored is called or calls a second communications subscriber, a conference circuit between the subscriber which is to be monitored, the calling or called second communications subscriber and a third communications subscriber which is authorized to monitor is set up.

National and international laws require that operators of a public, and in the future probably also of a private, network should permit so-called authorized agencies (criminal police, secret service etc.) to monitor the communications traffic of persons under suspicion, in compliance with certain legal regulations for the protection of communications subscribers (for example court orders). While this is relatively easy to do in the local exchange of the subscriber which is to be monitored in the case of conventional fixed-line telephone networks by flagging the corresponding subscriber data record and setting up a type of conference circuit to the authorized agency, in intelligent networks (IN) there is a basic problem. This results from the division of functions of signaling and of voice traffic between different network components. In the case of IN calls, it is generally not defined in advance which exchanges (VSt) calls of a subscriber which is to be monitored will pass through. In addition, all the data which are required for the monitoring operation (including IN numbers and fixed-network call numbers of the communications parties) are not available at the same location.

International Patent Disclosure WO 97/41678 has already specified a method for monitoring a communications link which is suitable for communications services with IN services.

SUMMARY OF THE INVENTION

It is accordingly an object of the invention to provide a method for monitoring a subscriber of an intelligent network which overcomes the above-mentioned disadvantages of the prior art methods of this general type, in which an improved method for monitoring a communications link is specified.

With the foregoing and other objects in view there is provided, in accordance with the invention, a method for monitoring subscribers of an intelligent network, which includes:

flagging an identifier of a subscriber to be monitored in a central database, the flagging containing an indication of which third communications subscribers is authorized to monitor a communications link of the subscriber to be monitored;

setting up, via an exchange having initiated a link to the central database, a conference circuit between the subscriber which is to be monitored, a calling or called second communications subscriber and at least one of the third communications subscribers which is authorized to monitor if the subscriber to be monitored is calling or is called by the second communications subscriber, and a decision as to whether monitoring of the subscriber to be monitored is initiated by the exchange being taken from the central database or a controller of the intelligent network as a function of a type of access to the controller; and transferring subscriber data which are characteristic of the subscribers of the intelligent network to the at least one third communications subscribers.

Because the authorized agency is interested in monitoring a communications link only if communication is actually taking place on the link, the invention distinguishes, in a demand-controlled fashion, between two (or even more) different monitoring methods. The significant advantage in comparison with the method that has already been described is the reduction of the loading on the communications network (SS7/INAP interface and exchange).

The method which is known from International Patent Disclosure WO 97/41678 is used according to the invention only if communication actually takes place via the communications link, so-called "call related activity". This can be determined by the type of access that is made to the service control point (SCP). Here, it is irrelevant whether the communications party is another person or a technical device such as a mailbox. In this case, the following procedure is adopted:

I. The subscriber that is to be monitored is an IN subscriber.
   a) The IN number of the subscriber that is to be monitored is flagged in the service control point (SCP). The flagging contains an indication of which authorized agencies are provided with a monitoring facility.
   b) In an extension of the IN-specific protocol between the SCP and the service switching point (SSP) (usually in the transit exchange (TE) of the calling subscriber), the SSP is informed that the respective telephone call is to be monitored, and by whom it is to be monitored.
   c) A conference circuit to the authorized agency is set up by the exchange in which the SSP is located. The link data (fixed-network call numbers, IN numbers, time, duration of the call) and the content of the call or of the data link are transmitted online to the authorized agency.

II. The communications party of the subscriber that is to be monitored is an IN subscriber.
   a) The call number of the subscriber that is to be monitored is flagged in the exchange of the subscriber. The flagging contains an indication of which authorized agencies are provided with a monitoring facility. If the subscriber that is to be monitored is a subscriber in the classic sense, i.e. is not an IN subscriber, the flagging occurs once in the local exchange of this subscriber. If the subscriber that is to be monitored is an IN subscriber, the flagging takes place in accordance with I noted above.
   b) The exchange that is mentioned in a) requests from the SSP of the communications party the data that are not present in the exchange (for example the IN number or the fixed-network call number of the communications party).
   c) The exchange sets up a conference circuit to the authorized agency. The link data (fixed-network call numbers, IN numbers, time, duration of the call) and the content of the call or of the data link are transmitted online to said authorized agency.

In the other case, if there is no communication, the procedure described above generates a higher degree of loading of the communications network. This is the case, for example, if an IN service is administered by the subscriber which is to be monitored, for example the setting up or changing of a call divert facility (call unrelated activity). It is completely sufficient here if only the event data are transferred from the SCP to the authorized agency without the associated exchange being involved.

Other features which are considered as characteristic for the invention are set forth in the appended claims.

Although the invention is illustrated and described herein as embodied in a method for monitoring a subscriber of an intelligent network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
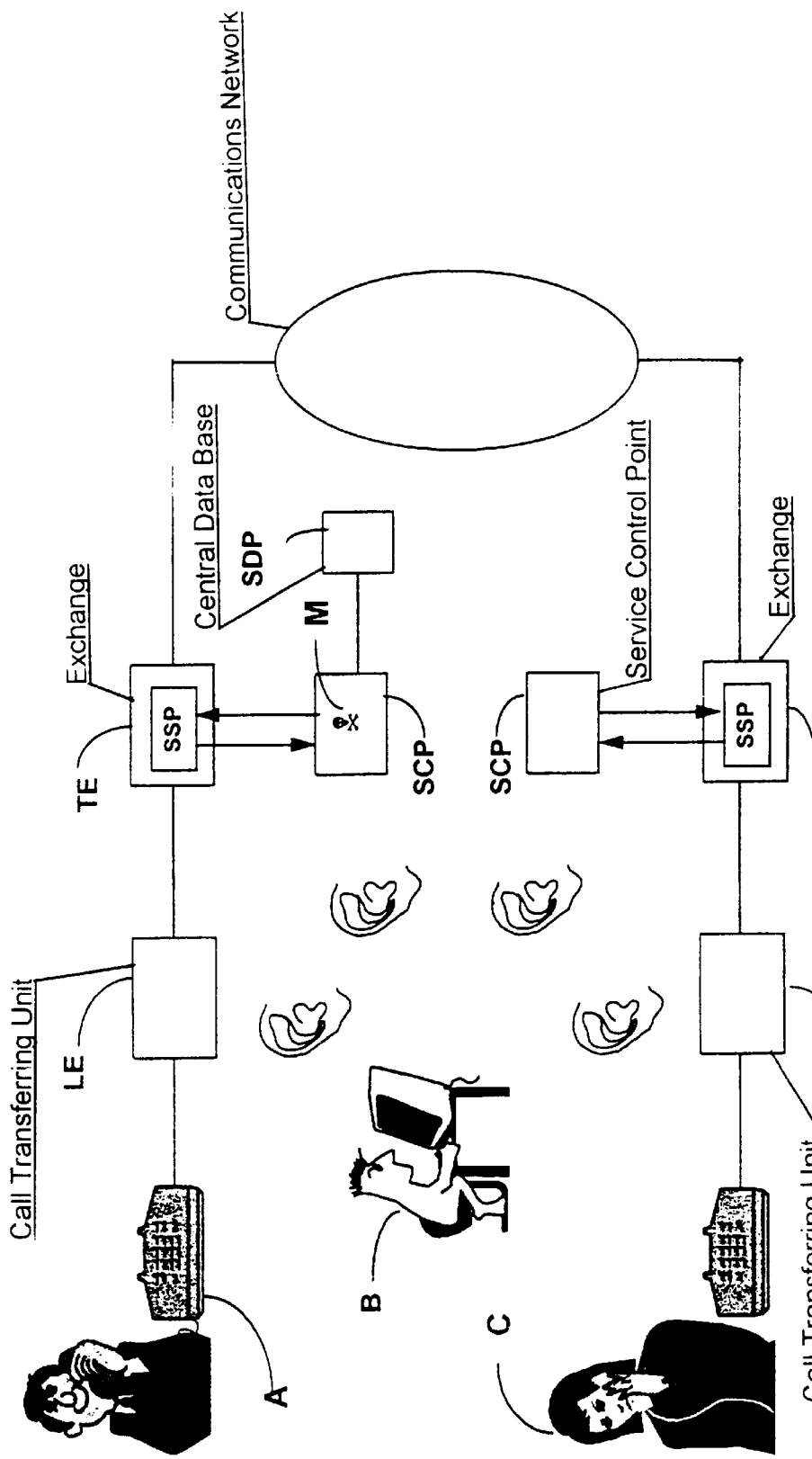
FIG. 1 is diagrammatic, block diagram of the principal architecture with monitored IN subscriber according to the invention.

In all the figures of the drawing, sub-features and integral parts that correspond to one another bear the same reference symbol in each case. Referring now to the figures of the drawing in detail and first, particularly, to FIG. 1 thereof, there is shown a sequencing protocol.

If a subscriber A that is to be monitored is an IN subscriber and the subscriber A calls a communications party C, for example as an outgoing UPT call, the following steps are performed.

a. At the request of an authorized agency B, the IN number A is flagged in a service control point (SCP) as to be monitored (which occurs once).

b. The subscriber A makes an outgoing UPT call and dials the call number of C. The call is transferred (via LE) and ultimately arrives at an exchange TE with a service switching point (SSP).

c. The SSP in the exchange TE transfers the IN number of A to the relevant service control point (SCP).

d. A service data function (SDF) in the SCP checks the data associated with the IN number that is to be transferred, the data includes call-metering information, flagging data M that the subscriber A is to be monitored; and an identity of the monitoring authorized agency.

e. If the call is a call for the purpose of communication, the SCP transmits the data to the SSP in the exchange TE. Otherwise, the SCP transmits only the event data to the authorized agency B without the involvement of the exchange TE.

f. If the exchange TE has received data from the SCP, it establishes a link both to C and to the authorized agency B.

g. The requested data (for example fixed-network call numbers and IN number, time and duration of the link) and the ongoing telephone call (or the data transmission) are transmitted to the authorized agency in a way which is imperceptible to A and C.

If the subscriber A that is to be monitored is an IN subscriber and is called by the communications party C, the following steps are observed.

a. At the request of the authorized agency B, the IN number of A is flagged in the SCP as to be monitored (procedure which occurs once). This can also be done with the aid of a service management point (SMP).

b. The caller C dials the IN number of the subscriber A.

c. The service switching point (SSP) transfers the IN number to the relevant service control point (SCP).

d. The service data function (SDF) in the SCP checks the data which are associated with the IN number to be transferred, including the fixed-network call number, the flagging data M that the subscriber A is to be monitored, and the identity of the monitoring authorized agency.

e. If the call is a call for the purpose of communication, the SCP transmits the data to the SSP in the exchange TE. Otherwise, the SCP transfers only the event data to the authorized agency B without the involvement of the exchange TE.

f. The exchange uses the data to establish a link both to A and to the authorized agency B.

g. The requested data (for example fixed-network call numbers, time and duration of the link) and the ongoing telephone call (or the data transmission) are transmitted from the exchange TE to the authorized agency B, in a way which is imperceptible to A and C.

Figure 2:
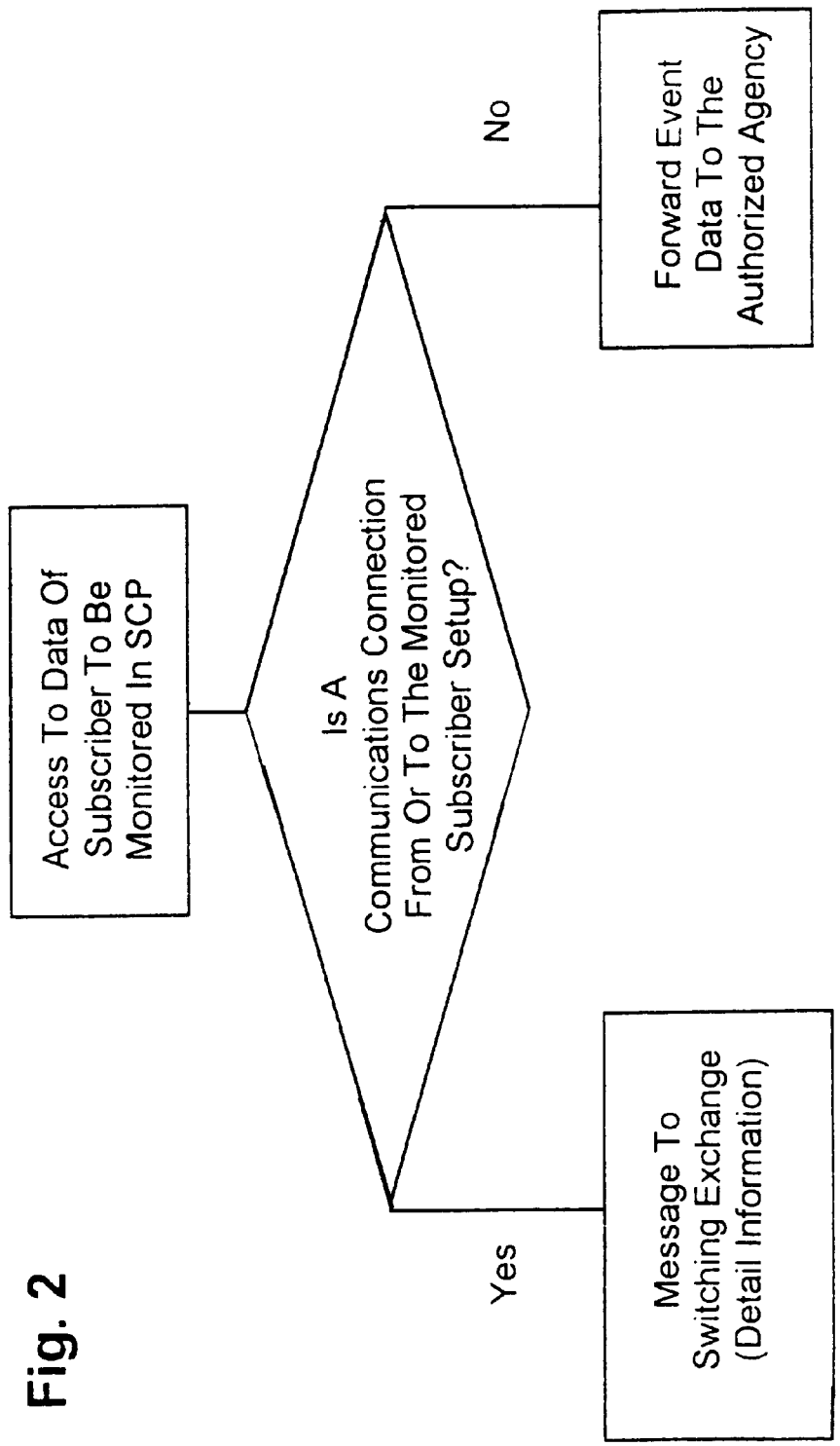
FIG. 2 is a flow chart of selection logic in a service control point.

FIG. 2 illustrates the selection logic according to which the SCP decides which monitoring method is to be used. In the process, the type of communications link, that is to say whether it is set up for the purpose of communication or, for example for modifying a call divert, follows from the type of access in the SCP.

I claim:

1. A method for monitoring subscribers of an intelligent network, which comprises:

flagging an identifier of a first communications subscriber to be monitored in a central database, the flagging containing an indication of at least one of a plurality of third communications subscribers authorized to monitor a communications link with the first communications subscriber to be monitored;

setting up, via an exchange having initiated a link to the central database, a conference circuit between the first communications subscriber to be monitored, a calling or called second communications subscriber and at least one of the third communications subscribers being authorized to monitor when the first communications subscriber to be monitored calling or being called by the calling or called second communications subscriber, and a decision as to whether monitoring of the first communications subscriber to be monitored is initiated by the exchange being made by the central database or a controller of the intelligent network depending on whether the first communication subscriber wants to contact a third communication subscriber; and transferring subscriber data being characteristic of the subscribers of the intelligent network and corresponding event data directly from the central database or the controller of the intelligent network to the at least one third communications subscribers authorized to monitor when no communication is taking place between the first communications subscriber to be monitored and the calling or called second communications subscriber via the exchange.

2. The method according to claim 1, which comprises performing an initiation of the monitoring in the exchange only if the first communications subscriber to be monitored is called or the first communications subscriber calls the calling or called second communications subscriber.

3. The method according to claim 1, which comprises transmitting the characteristic subscriber data and the event data directly from one of the central database and the controller of the intelligent network to the at least one third communications subscribers authorized to monitor when the central database is accessed without the first communications subscriber to be monitored dialing a different call number or being called.

* * * * *